United States Patent
Singh et al.

(10) Patent No.: US 8,458,418 B1
(45) Date of Patent: Jun. 4, 2013

(54) REPLICATION OF DEDUPLICATED DATA BETWEEN MULTI-CONTROLLER SYSTEMS

(75) Inventors: Pratap Singh, Mountain View, CA (US); Lan Chin, Sunnyvale, CA (US); Nitin Garg, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 250 days.

(21) Appl. No.: 12/983,213

(22) Filed: Dec. 31, 2010

(51) Int. Cl.
*G06F 12/16* (2006.01)

(52) U.S. Cl.
USPC .......................................... 711/161; 711/162

(58) Field of Classification Search
None
See application file for complete search history.

(56) References Cited

U.S. PATENT DOCUMENTS

| | | | |
|---|---|---|---|
| 2009/0275310 A1* | 11/2009 | Fletcher et al. | 455/412.1 |
| 2011/0029730 A1* | 2/2011 | Durocher et al. | 711/114 |
| 2011/0040732 A1* | 2/2011 | Anglin et al. | 707/687 |
| 2012/0159098 A1* | 6/2012 | Cheung et al. | 711/162 |

* cited by examiner

*Primary Examiner* — Than Nguyen
(74) *Attorney, Agent, or Firm* — Theodore A. Chen; Krishnendu Gupta

(57) ABSTRACT

A method, article of manufacture, and apparatus for processing information are disclosed. In some embodiments, this includes mapping a target multi-controller system, determining a target controller to send a data chunk to based on the mapping, determining if the target controller is missing any portion of the data chunk, and sending the missing portions of the data chunk to the target controller. In some embodiments, sending the missing portions of the data chunk to the target controller includes sending the missing portions of the data chunk from a source multi-controller system to the target. The source multi-controller system may have a first number of controllers and the target multi-controller system may have a second number of controllers.

9 Claims, 2 Drawing Sheets

REPLICATION OF DEDUPLICATED DATA BETWEEN MULTI-CONTROLLER SYSTEMS

FIELD OF THE INVENTION

The present invention relates generally to data systems, and more particularly, to systems and methods of processing information.

BACKGROUND OF THE INVENTION

Modern data systems typically manage a large amount of data. In order to make the large amount of data more manageable, techniques such as deduplication are applied. Deduplication includes removing redundant instances of data so that only a single instance of data is stored.

Modern data systems are also typically spread across physical devices. These physical devices may include controllers, such as the Data Domain DD880 controller provided by EMC Corporation.

Deduplication may be applied across many physical devices, such as multiple DD880 controllers. This allows for a single instance of data to be shared across many physical devices. However, when data from a multi-controller system needs to be moved to another multi-controller system, such as replication, many of the benefits of deduplication are lost.

There is a need, therefore, for an improved method, article of manufacture, and apparatus for processing information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
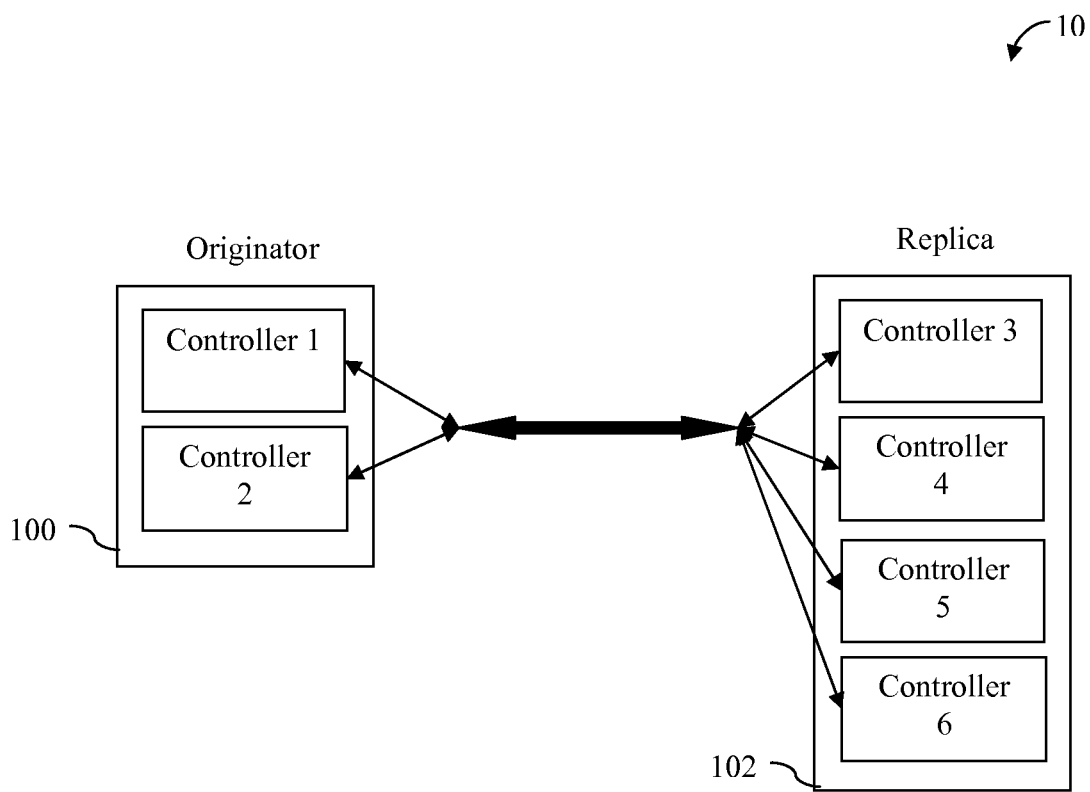
FIG. 1 is a diagram of sample query plan.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with some embodiments. Data System 10 has Originator 100 and Replica 102. Originator 100 is a multi-controller system with Controllers 1 and 2. Replica 102 is a multi-controller system with Controllers 3, 4, 5 and 6. Though FIG. 1 illustrates a data system with two multi-controller systems, the enhanced techniques described herein are equally applicable to a different number of multi-controller systems. For example, a data system may have three multi-controller system, with each multi-controller system replicating to another (e.g multi-controller 1 replicating to multi-controller 2, which replicates to multi-controller 3, which replicates to Multi-controller 1).

In some embodiments, data in a multi-controller system may be deduplicated by splitting the data into super-chunks. The size of the super-chunks for may vary. For example, in some embodiments, the super-chunks may be 1 MB in size. Super-chunks themselves may be split into portions of data. For example, Super Chunk A may have Portions 1, 2, 3 and 4. With comparing portions, it is possible to send only a portion of a super-chunk instead of the whole super chunk. Instead of sending the whole 1 MB super-chunk, it may be possible to send only 10 kb if the target of the data transfer already has a substantial majority of the portions of the super-chunk.

Multi-controllers may be globally deduplicated (e.g. only one copy of a super-chunk is stored in the multi-controller system) by routing similar super-chunks to the same controller. For example, in a multi-controller system with four controllers, super-chunk A may be on controller 1, but not on any other controller.

When transferring or replicating data from one multi-controller system to another in conventional systems, the benefits of deduplication may be lost. For example, referring to FIG. 1, suppose Originator 100 has super chunks A and B, with super chunk A in Controller 1, and super chunk B in Controller 2. Further suppose that Replica 102 has super chunk A, with super chunk A in Controller 6, and Controllers 3, 4, and 5 are empty. Conventional methods of replication may move super chunk A from Originator 100 to Controller 3 in Replica 102, and may move super chunk B from Originator 100 to Controller 4 in Replica 102. Since Controller 3 doesn't have a copy of super chunk A, or any portion of super chunk A, the entire super chunk A would be moved from Originator 100 to Controller 3. Similarly, since Controller 4 doesn't have a copy of super chunk B, or any portion of super chunk B, the entire super chunk B would be moved from Originator 100 to Controller 4. In this case, Replica 102 would lose its global deduplication because there are two copies of super chunk A in Replica 102.

Figure 2:
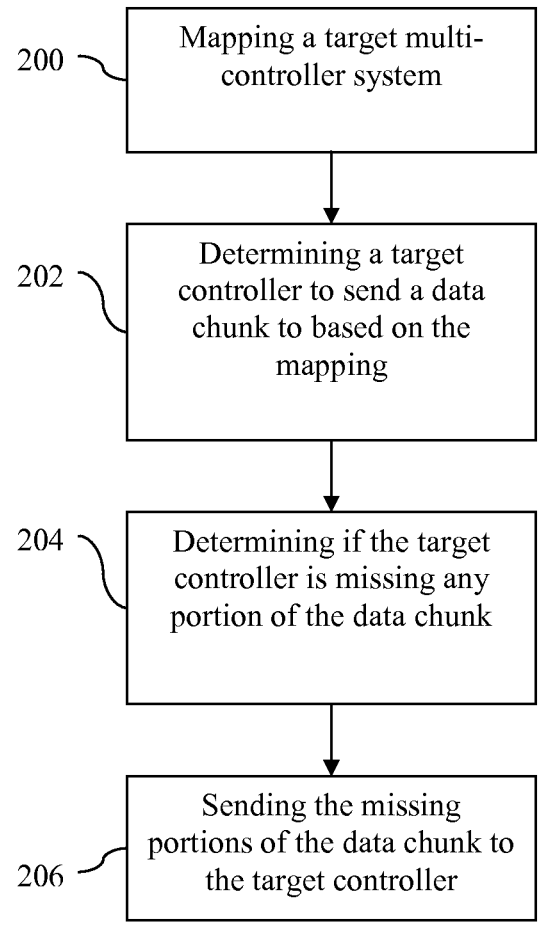
FIG. 2 is a flowchart of a method to process information in accordance with some embodiments.

The enhanced techniques described herein allow the benefits of deduplication to be retained while transferring or replicating data from one multi-controller system to another. FIG. 2 illustrates a method to process information in accordance with some embodiments. In step 200 the target multi-controller system is mapped. Mapping allows a replication process to determine if the target multi-controller system has a chunk, and if so, in which controller does the chunk reside. There are various ways to implement mapping. In some embodiments, a "master" controller in the target multi-controller may contain an index file. The index file may contain the information necessary for mapping (e.g. which chunks are in the multi-controller system, what portions make up a chunk, and which controller has which chunk, etc.) When a source multi-controller system attempts to replicate data to the target multi-controller system, the source multi-controller system may first connect to the master controller in the target multi-controller system before replicating data.

In step 202, a target controller to send a data chunk to is determined based on the mapping. For example, if mapping reveals that Controller 6 has Chunk A, while another controller has no data, it may make sense to send the data chunk to the empty controller if the data chunk is not Chunk A. If the data chunk is Chunk A, the target controller would be Controller 6 since Controller 6 already has Chunk A, and a transfer would not be necessary.

In step 204, it is determined if the target controller is missing any portion of the data chunk. For example, if the target controller had Portions 1, 2 and 3, and Chunk A comprised of Portions 1, 3 and 5, the missing portion would be Portion 5.

In step 206, the missing portion of the data chunk is sent to the target controller. Using the above example, since the missing portion is Portion 5, only Portion 5 would be sent to the target.

Though the above example illustrates only one missing portion, it is possible to have a plurality of missing portions. In some embodiments, the missing portion may be all the portions (e.g. no portion of the chunk is in the target controller).

In some embodiments, an index may be updated after the replication or data transfer operation has concluded. For example, the index may modified to indicate that several controllers in the target multi-controller system has additional portions, additional chunks, etc.

Using the enhanced techniques described herein, global deduplication of data stored in a source multi-controller system can be preserved on a target multi-controller system without repeating the global deduplication mechanism on the target multi-controller system. This can save processing time and memory on the target multi-controller. Further, the enhanced techniques described herein are applicable to situations where the source multi-controller system and the target multi-controller system each have a different number of controllers, and the replication mechanism need not be aware of the difference. The configuration of the target multi-controller system is transparent to the replication mechanism. All the replication mechanism needs to know is which target controller to put the data chunk in (may be via mapping), and which portions of the data chunk does the target controller need. Further, the replication mechanism need not be aware of any changes to the target multi-controller system. For example, if new controllers are added, or new storage is added, the replication mechanism may still replicate data while maintaining the benefits of deduplication since mapping will provide this information.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing information, comprising:
mapping a target multi-controller system, wherein mapping includes using an index file to store mapping information, wherein mapping information includes a list of data chunks in the target multi-controller system, a list of portions that make up each chunk in the list of data chunks, and a list of controllers, wherein each controller in the list of controllers has a corresponding data chunk;

determining a target controller to send a data chunk to based on the mapping;
determining if the target controller is missing any portion of the data chunk;
sending the missing portions of the data chunk from a source multi-controller system to the target controller, wherein the source multi-controller system has a different number of controllers than the target multi-controller system; and
updating the index file based on the sent the missing portions.

2. The method as recited in claim 1, wherein sending the missing portions of the data chunk to the target controller includes sending the missing portions of the data chunk from a source multi-controller system to the target.

3. The method as recited in claim 2, wherein the source multi-controller system has a first number of controllers and the target multi-controller system has a second number of controllers.

4. A system for processing information, comprising a target multi-controller system, a target controller, a source multi-controller system, and a processor configured to:
map a target multi-controller system, wherein map includes use an index file to store mapping information, wherein mapping information includes a list of data chunks in the target multi-controller system, a list of portions that make up each chunk in the list of data chunks, and a list of controllers, wherein each controller in the list of controllers has a corresponding data chunk;
determine a target controller to send a data chunk to based on the mapping;
determine if the target controller is missing any portion of the data chunk;
send the missing portions of the data chunk from the source multi-controller system to the target controller, wherein the source multi-controller system has a different number of controllers than the target multi-controller system; and
update the index file based on the sent missing portions.

5. The system as recited in claim 4, wherein send the missing portions of the data chunk to the target controller includes send the missing portions of the data chunk from a source multi-controller system to the target.

6. The system as recited in claim 5, wherein the source multi-controller system has a first number of controllers and the target multi-controller system has a second number of controllers.

7. A computer program product for processing information data, comprising a computer readable medium having program instructions embodied therein for:
mapping a target multi-controller system, wherein mapping includes using an index file to store mapping information, wherein mapping information includes a list of data chunks in the target multi-controller system, a list of portions that make up each chunk in the list of data chunks, and a list of controllers, wherein each controller in the list of controllers has a corresponding data chunk;
determining a target controller to send a data chunk to based on the mapping;
determining if the target controller is missing any portion of the data chunk;
sending the missing portions of the data chunk from a source multi-controller system to the target controller, wherein the source multi-controller system has a different number of controllers than the target multi-controller system; and
updating the index file based on the sent missing portions.

8. The computer program product as recited in claim 7, wherein sending the missing portions of the data chunk to the target controller includes sending the missing portions of the data chunk from a source multi-controller system to the target.

9. The computer program product as recited in claim 8, wherein the source multi-controller system has a first number of controllers and the target multi-controller system has a second number of controllers.

* * * * *